United States Patent [19]

Howard

[11] Patent Number: 5,234,712

[45] Date of Patent: Aug. 10, 1993

[54] METHOD OF MAKING MOISTURE RESISTANT ALUMINUM NITRIDE POWDER AND POWDER PRODUCED THEREBY

[75] Inventor: Kevin E. Howard, Midland, Mich.

[73] Assignee: The Dow Chemical Company, Midland, Mich.

[21] Appl. No.: 895,496

[22] Filed: Jun. 8, 1992

[51] Int. Cl.$^5$ .................. B05D 7/00; B32B 5/16
[52] U.S. Cl. .................. 427/215; 427/212; 427/397.7; 428/403; 428/405
[58] Field of Search .............. 427/212, 215, 397.7, 427/226; 428/402, 403, 405; 252/518

[56] References Cited

U.S. PATENT DOCUMENTS 4,572,844  2/1986  Inoue et al. .................. 427/212

Primary Examiner—Shrive Beck
Assistant Examiner—David M. Maiorana

[57] ABSTRACT

A method for making a moisture-resistant aluminum nitride-containing powder which includes (a) coating a layer of silicate onto aluminum nitride-containing powder having aluminum nitride on at least a portion of its surface and (b) heat-treating the coated aluminum nitride-containing powder at a temperature of from about 350° to about 1000° C. for a period of time sufficient to cause the silicate to react with the surface aluminum nitride thereby forming a layer of Si-Al-O-N bonded to the surface aluminum nitride. The silicate has alkyl or alkoxyalkyl radicals attached thereto. The method yields a moisture-resistant aluminum nitride-containing powder having a layer of Si-Al-O-N reaction-bonded to the surface aluminum nitride.

17 Claims, No Drawings

METHOD OF MAKING MOISTURE RESISTANT ALUMINUM NITRIDE POWDER AND POWDER PRODUCED THEREBY

TECHNICAL FIELD

This invention relates generally to a method for making moisture-resistant aluminum nitride-containing powder and powder produced thereby More specifically, this invention relates to a method for treating aluminum nitride-containing powder to form a protective layer on its surface and the treated powder produced thereby.

BACKGROUND OF THE INVENTION

Aluminum nitride powder has been found to be an excellent filler material for thermally-conductive polymer composites used as heat sink materials in the electronics industry. Using aluminum nitride powder as a filler results in a polymer composite having higher thermal conductivity than when using the common filler, silica.

However, using virgin aluminum nitride powder in polymer composites is not without its problems. Polymer composites exhibit some water permeability, and, because aluminum nitride is sensitive to hydrolysis, some protection of the aluminum nitride powder from hydrolysis is desired.

A second problem with using virgin aluminum nitride powder occurs during storage of the powder. Air-borne moisture attacks the aluminum nitride powder causing the powder to experience an increase in oxygen content and a concomitant weight gain.

It is, therefore, a primary object of the invention to provide an easy method for making moisture-resistant aluminum nitride-containing powder.

It is another object of the invention to provide aluminum nitride-containing powder having a moisture-resistant protective layer on its surface.

SUMMARY OF THE INVENTION

In accordance with preferred embodiments of the invention, these and other objects and advantages are addressed as follows. A method for making a moisture-resistant aluminum nitride-containing powder is disclosed which comprises:

(a) coating a layer of a silicate onto aluminum nitride-containing powder having aluminum nitride on at least a portion of its surface, the silicate having substituents thereon selected from the group consisting of alkyl and alkoxyalkyl radicals, and (b) heat-treating the coated aluminum nitride-containing powder at a temperature of from about 350° to about 1000° C. for a period of time sufficient to cause the silicate to react with the surface aluminum nitride thereby forming treated aluminum nitride-containing powder having a layer of Si—Al—O—N bonded to the surface aluminum nitride.

In another embodiment of the invention, a method for making a moisture-resistant aluminum nitride powder is disclosed which comprises:

(a) coating a layer of a silicate onto aluminum nitride powder by (i) dispersing the aluminum nitride powder in a first alkyl alcohol having from 1 to 4 carbon atoms, inclusive, to form a dispersion, and (ii) dissolving into the dispersion, in the following order:

(A) a solution of the silicate and a second alkyl alcohol having from 1 to 4 carbon atoms, inclusive, the silicate having substituents thereon selected from the group consisting of alkyl and alkoxyalkyl radicals, the silicate being employed in an amount from greater than about 1 to about 150 weight percent based on the weight of the aluminum nitride powder; the first and second alkyl alcohols being employed in an amount from about 50 to about 300 volume percent based on the volume of the aluminum nitride powder, (B) water being employed in an amount from about 100 to about 400 weight percent based on the weight of the silicate, and (C) a hydrolysis catalyst selected from the group consisting of organic acids selected from the group consisting of acetic acid, formic acid, and propionic acid and inorganic acids selected from the group consisting of hydrochloric acid and sulfuric acid, the hydrolysis catalyst being employed in an amount of from about 10 to about 25 weight percent based on the weight of the water, the aluminum nitride powder, the alkyl alcohols, the silicate, the water, and the hydrolysis catalyst forming a dispersion-solution, (b) allowing the aluminum nitride powder to contact the remaining components in the dispersion-solution for at least 5 minutes, (c) drying the dispersion-solution to form coated aluminum nitride powder, and (d) heat-treating the coated aluminum nitride powder at a temperature of from about 350° to about 1000° C. for a period of time sufficient to cause the silicate to react with the aluminum nitride powder thereby forming a layer of Si—Al—O—N bonded to the aluminum nitride powder.

In yet another embodiment of the invention, a moisture-resistant aluminum nitride-containing powder is prepared which comprises aluminum nitride-containing powder having a layer of Si-Al-O-N reaction-bonded to at least a portion of its surface.

DETAILED DESCRIPTION OF THE INVENTION

Generally, the invention entails a method for making a moisture-resistant aluminum nitride-containing powder and the powder produced thereby. The method includes (a) coating a layer of a silicate onto aluminum nitride-containing powder having aluminum nitride on at least a portion of its surface and (b) heat-treating the coated aluminum nitride-containing powder at a temperature of from about 350° about 1000° C. for a period of time sufficient to cause the silicate to react with the surface aluminum nitride thereby forming a layer of Si—Al—O—N bonded to the surface aluminum nitride.

The aluminum nitride-containing powder treated in this invention may be (a) a composite powder containing aluminum nitride, at least some of which is at the surface of the powder, or (b) a powder formed substantially of aluminum nitride. With either type of powder, the surface aluminum nitride may or may not have a "skin" of Al—O—N thereon. Although there is no minimum level of surface aluminum nitride for the aluminum nitride-containing powder used in this invention, typically, the level of aluminum nitride in the composite powder would be at least about 10 weight percent of the composite powder. Examples of other materials which could be combined with aluminum nitride to form composite powders include ceramics, such as silicon carbide, boron nitride, and silicon nitride, or metals, such as titanium, aluminum, and silicon. The aluminum nitride-containing powder which may be used in this invention is not limited in size or amount of surface area.

The silicate which is used to coat the aluminum nitride-containing powder has the following general structure:

$RO(\{RO\}_2SiO)_nSi(OR)_3$ wherein each R is independently selected from the group consisting of alkyl and alkoxyalkyl radicals, the alkyl and alkoxyalkyl radicals having from to 12 carbon atoms, inclusive, and n is a number from zero to 2, inclusive. In this context, "independently selected" means that each of the R radicals may be the same or different. The alkyl or alkoxyalkyl radicals may be linear or branched. As can be seen from the chemical structure, the silicate may be a monosilicate or a polysilicate.

Examples of suitable alkyl silicates include tetramethylorthosilicate, tetraethylorthosilicate, tetra-n-propylorthosilicate, tetraisopropylorthosilicate, tetrabutylorthosilicate, hexamethoxydisiloxane, and octamethoxytrisiloxane. An example of a suitable alkoxyalkyl silicate is tetramethoxyethylsilicate.

Various methods of coating the silicate onto the aluminum nitride-containing powder may be employed in this invention. For instance, the silicate may be applied to the powder by techniques such as chemical vapor deposition or solution coating.

SOLUTION COATING

A preferred method for coating the silicate onto the aluminum nitride-containing powder is by solution coating. Generally, this method is performed by coating a solution of the silicate and a solvent onto the aluminum nitride-containing powder and, subsequently, removing the solvent from the coating to form a dry, silicate-coated powder. Preferably, the removal of the solvent is completed before heat-treating the coated aluminum nitride-containing powder at the temperature of from about 350° to about 1000° C. An example technique of solution coating is aerosol coating.

A typical coating solution includes an alkyl alcohol having from 1 to 4 carbon atoms, inclusive, as the solvent, the silicate, and water. A hydrolysis catalyst may be included in the coating solution to hasten the hydrolysis of the silicate.

The total amount of solvent used in the method merely needs to be enough to assist in applying the coating solution onto the aluminum nitride-containing powder. Preferably, the solvent is employed in an amount from about 50 to about 300 volume percent based on the volume of the aluminum nitride-containing powder.

In the coating solution, the silicate may be employed at levels of from greater than about 1 to 150 weight percent based on the weight of the aluminum nitride-containing powder. However, levels higher than 150 weight percent may be used. When a large enough excess of silicate is used, the outermost material on the final heat-treated powder would contain substantially Si and O. Preferably, the silicate is employed in the coating solution at levels from about 5 to about 50 weight percent and, more preferably from about 5 to about 10 weight percent based on the weight of the aluminum nitride-containing powder.

Water is generally employed in an amount from about 100 to about 400 weight percent based on the weight of the silicate, and more typically, in an amount from about 100 to about 200 weight percent based on the weight of the silicate.

Useful hydrolysis catalysts include organic acids, such as acetic acid, formic acid, and propionic acid and inorganic acids such as hydrochloric acid and sulfuric acid, and bases, such as sodium hydroxide, potassium hydroxide, and ammonium hydroxide. The amount of hydrolysis catalyst employed merely needs to be a catalytic quantity, that is, enough needed to increase the hydrolysis of the silicate. The hydrolysis catalyst is generally employed in an amount from about 10 to about 75 weight percent based on the weight of the water.

To coat the aluminum nitride-containing powder, the coating solution may be prepared first, followed by application of the coating solution onto the aluminum nitride-containing powder. However, it has been found to be preferred to: (a) disperse the aluminum nitride-containing powder in a non-aqueous solvent for the silicate to form a dispersion, then (b) dissolve into the dispersion, in the following order: (i) the silicate, (ii) water, and (iii) the optional hydrolysis catalyst. Additionally, the silicate may be added to the aluminum nitride-containing powder dispersion as a solution of the silicate in a solvent such as an alkyl alcohol having from 1 to 4 carbon atoms, inclusive. The optional solvent for the silicate may be the same as or different than the non-aqueous solvent used to prepare the aluminum nitride-containing powder/solvent dispersion.

It is preferred to allow the coating solution to remain in contact with the aluminum nitride-containing powder for at least about 5 minutes before subjecting the aluminum nitride-containing powder to drying or to the high-temperature heat-treating step.

After the aluminum nitride-containing powder has been coated with silicate via a solution coating method, the coated powder may be heat-treated directly or the solvent may be removed from the powder to any degree of dryness. However, the powder is preferably dried to a flowable powder. It is preferred not to dry the aluminum nitride-containing powder by filtration, but rather to dry the powder by evaporation. Evaporation allows the silicate to remain with the aluminum nitride-containing powder. Drying methods which include thermal or vacuum removal of the solvent may be used. The most desirable methods of evaporating the solvent are by spray drying or by oven drying. Preferably, drying temperatures of from about 100° to about 150° C. are employed, although other temperatures are suitable.

HEAT-TREATMENT STEP

Once the aluminum nitride-containing powder is coated with silicate, and preferably dried, the coated powder is heat-treated at a temperature of from about 350° to about 1000° C., more preferably, at a temperature of from about 500° to about 700° C., and, most preferably, at a temperature of from about 500° to about 650° C. It is most desirable to perform the heat-treatment step in a flowing oxygen-containing atmosphere, such as air.

The heat-treatment step is performed at least until a layer of Si—Al—O—N is formed on the surface aluminum nitride of the powder. Typically, the heat-treatment step is performed for a period of from about 10 minutes to about 12 hours and, more typically, for a period of from about 1 hour to about 2 hours.

A SECOND TREATMENT

Optionally, but preferably, the treated aluminum nitride containing powder may be treated again by (a) coating a second layer of silicate onto the treated aluminum nitride-containing powder and, subsequently, (b) heat-treating the coated treated aluminum nitride-containing powder at a temperature of from about 350° to about 1000° C. for a period of time sufficient to form an amorphous layer containing Si and O on the surface of the treated aluminum nitride-containing powder. The second silicate used in the second treatment may be the same or different than the first silicate, that is, the silicate used in the first treatment.

The method of performing the second treatment is the same as that described above for the first treatment, except the preferred level of silicate employed in the solution coating is based on the weight of the treated aluminum nitride-containing powder and the preferred level of solvent employed is based on the volume of the treated aluminum nitride-containing powder. In other words, in the coating solution the silicate may be employed at levels from greater than about 1 to about 150 weight percent based on the weight of the treated aluminum nitride-containing powder, and the solvent is preferably employed in an amount from about 50 to about 300 volume percent based on the volume of the treated aluminum nitride-containing powder.

THE PRODUCT

Usually, untreated aluminum nitride powder has a surface layer thereon of Al—O—N of about 20-100 Angstroms (200-1000 nanometers) thick due to oxidation of the aluminum nitride in air. The method of this invention causes silicon and oxygen to be reaction-bonded into the Al—O—N layer or AlN if Al—O—N is not present, so that an amorphous layer of Si—Al—O—N is created. The Si—Al—O—N layer is about the same thickness of the Al—O—N layer, that is, about 20-100 Angstroms (200-1000 nanometers) thick, thus creating a denser surface layer on the aluminum nitride powder and providing the interior aluminum nitride with better protection from moisture. Due to the reaction-bonding, the final layer of Si—Al—O—N strongly adheres to the surface aluminum nitride on the powder and is not merely coated thereon. The silicon and oxygen are found to be incorporated into the Al—O—N layer in about a 1:1.65 ratio of silicon to oxygen.

When the treated aluminum nitride-containing powder undergoes a second treatment according to the invention, the second treatment adds an amorphous layer of Si and O, which may also contain Al, to the outside surface of the treated powder. Typically, using the solution coating technique, the amorphous layer is a continuous layer having a typical thickness ranging from about 60 to about 250 Angstroms (600-2500 nanometers). Aluminum nitride-containing powder that has undergone a second treatment according to the invention has superior humidity resistance relative to aluminum nitride-containing powder having undergone only a single treatment according to the invention.

The product of this invention may be used as the ceramic powder in making aluminum nitride-containing ceramic articles. Due to the moisture resistance of the aluminum nitride-containing powder, the ceramic articles may be prepared by first making a slurry of the aluminum nitride-containing powder in water and, subsequently, drying and compacting the slurry to form a greenware article, and sintering the greenware article to form a ceramic article.

The product of this invention may also be used as a ceramic filler in polymer composites, such as epoxy polymers filled with aluminum nitride-containing powder. Such polymer composites are useful as heat sink materials in the microelectronics industry.

Thus, there is provided in accordance with the present invention, an easy method for making moisture-resistant aluminum nitride-containing powder by treating aluminum nitride-containing powder to form a moisture-resistant protective layer on the surface of aluminum nitride-containing powder. Also provided by the invention is aluminum nitride-containing powder having a moisture-resistant protective layer on its surface.

The following examples are illustrative only and should not be construed as limiting the invention which is properly delineated in the appended claims.

EXAMPLES 25.0 g of aluminum nitride powder having a surface area of 0.6 $m^2/g$ were added to 100 mL of absolute ethanol to form a dispersion. 25.0 mL of tetraethylorthosilicate ($Si(OC_2H_5)_4$), 25.0 mL HPLC-grade water, and 15 mL of 1N acetic acid were admixed into the aluminum nitride powder/ethanol dispersion in the order listed to form a mixture. The mixture was stirred for one hour and then placed in a round-bottom flask. The powder in the mixture was then partially dried using a water-aspirated vacuum and dried to completion in an oven having a temperature of 120° C. for 18 hours. The dried powder was then fired at 550° C. for one hour in a flowing air atmosphere.

Samples of the treated, fired powder and untreated powder were each placed in glass vials and weighed. The sample-filled vials were then placed in a humidity chamber set at 35° C. and 80% relative humidity 650 hours. The sample-filled vials were then removed from the humidity chamber, allowed to return to ambient conditions, and re-weighed to determine weight gain due to hydrolysis of the aluminum nitride powder samples. The untreated powder experienced a weight gain of 0.217 percent, whereas the treated powders did not experience a weight gain.

EXAMPLE 2

2.0 g of aluminum nitride powder having a surface area of about 1 $m^2/g$ was added to 20 mL of absolute ethanol in a beaker to form a dispersion. To this dispersion, 2.0 mL of tetraethylorthosilicate were added to form a mixture, and the mixture was stirred for five minutes. 2.0 mL of HPLC-grade water were admixed to the mixture. After 30 minutes of stirring the mixture, the stirring was ceased, and the beaker was placed in a 75° C. oven for 18 hours. The resultant powder was heat-treated at 600° C. in flowing air for one hour.

Following the same procedure as described in Example 1, the treated, fired powder and untreated powder were placed in a humidity chamber for 100 hours at 85° C. and 80% relative humidity. The untreated powder experienced a 24.781% weight gain, whereas the treated, fired powder experienced a 0.040% weight gain.

EXAMPLES 3-7

Using the same coating procedure as described in Example 2, aluminum nitride powder was coated with 1, 5, 10, 20, and 25 Weight percent tetraethylorthosilicate (TEOS) per weight of aluminum nitride powder. Each of the treated powders were dried and heat-treated in air at 600° C. for one hour. Samples of the treated powders and of untreated powder were then exposed to 85° C. and 85% relative humidity for 100 hours in a humidity chamber. The weight gain results are shown in Table 1 for the untreated powder and for the treated, fired powders.

TABLE 1

| Example # | Weight % TEOS | % Weight gain |
|---|---|---|
| — | 0 | 29.369 |
| 3 | 1 | 23.365 |
| 4 | 5 | 2.132 |
| 5 | 10 | 2.066 |
| 6 | 20 | 2.347 |
| 7 | 25 | 1.342 |

EXAMPLE 8

This example illustrates single and double treating aluminum nitride powder according to the invention.

1700 g of aluminum nitride powder was slurried in 1000 mL of absolute ethanol. To this slurry, a solution of 200 mL tetraethylorthosilicate and 100 mL absolute ethanol were slowly added accompanied by stirring. 200 mL of HPLC-grade water and 50 mL of 1 N acetic acid were then admixed to the slurry. After stirring for five additional minutes, the slurry was partially dried under a flowing nitrogen atmosphere for 3 hours. Then, the partially dried slurry was further dried for 2 hours at 120° C. The resultant powder was then heat-treated in air at 550° C. for one hour. A portion of the heat-treated powder was sieved using a 30 mesh screen and reserved as the single-treated powder.

830 g of the above heat-treated powder was slurried in 500 mL absolute ethanol. To this slurry a solution of 100 mL tetraethylorthosilicate and 100 mL absolute ethanol were slowly added accompanied by stirring. 100 mL of HPLC-grade water and 25 mL of 1 N acetic acid were then added to the slurry. After 5 minutes of additional stirring, the slurry was partially dried for 2 hours in a flowing nitrogen atmosphere. The partially dried slurry was then further dried at 12° C. for 2 hours, then heat-treated in air at 550° C. for one hour. The resultant powder was sieved through a 30 mesh screen and reserved as the double treated powder.

The single-treated and double-treated aluminum nitride powders were each blended at a level of 73 weight percent in a novalac epoxy resin to form polymer composites. The polymer composites were allowed to cure and exposed to 100% relative humidity and 121° C. to measure the relative levels of weight increase experienced by the two polymer composites.

The polymer composite using the single-treated aluminum nitride powder exhibited a weight percent increase of 1.1916% after 150 hours and 1.380% after 350 hours of exposure to 100% relative humidity and 121° C. In contrast, the polymer composite using the double-treated aluminum nitride powder exhibited a weight percent increase of 0.9422 after 150 hours and 1.058% after 350 hours of exposure to 100% relative humidity and 121° C., thus, illustrating that the double-treated aluminum nitride powder exhibits improved hydrolytic stability relative to the single-treated aluminum nitride powder.

While my invention has been described in terms of a specific embodiment, it will be appreciated that other embodiments could readily be adapted by one skilled in the art. Accordingly, the scope of my invention is to be limited only by the following claims.

What is claimed is:

1. A method for making a moisture-resistant aluminum nitride-containing powder, comprising:
    (a) coating a layer of a silicate onto aluminum nitride-containing powder having aluminum nitride on at least a portion of its surface, the silicate having substituents thereon selected from the group consisting of alkyl and alkoxyalkyl radicals, and
    (b) heat-treating the coated aluminum nitride-containing powder at a temperature of from about 350° to about 1000° C. for a period of time sufficient to cause the silicate to react with the surface aluminum nitride thereby forming treated aluminum nitride-containing powder having a layer of Si—Al—O—N bonded to the surface aluminum nitride.

2. The method of claim 1, wherein the silicate has the following general structure:

$$RO({RO}_2SiO)_nSi(OR)_3$$

wherein each R is independently selected from the group consisting of alkyl and alkoxyalkyl radicals, the alkyl and alkoxyalkyl radicals having from 1 to 12 carbon atoms, inclusive, and n is a number from zero to 2, inclusive.

3. The method of claim 1, wherein the heat-treating step is performed at a temperature of from about 500° to about 700° C.

4. The method of claim wherein the heat-treating step is performed for a period from about 10 minutes to about 12 hours.

5. The method of claim wherein the heat-treating step is performed for a period from about 1 hour to about 2 hours.

6. The method of claim 1, wherein the coating step is performed by applying a solution of the silicate and a solvent onto the aluminum nitride-containing powder, and the method further comprises removing the solvent from the coating before heat-treating the coated aluminum nitride-containing powder.

7. The method of claim 1, further comprising:
    (c) coating a layer of a second silicate onto the treated aluminum nitride-containing powder, the second silicate having substituents thereon selected from the group consisting of alkyl and alkoxyalkyl radicals, and
    (d) heat-treating the coated treated aluminum nitride-containing powder at a temperature of from about 350° to about 1000° C. for a period of time sufficient to cause the second silicate to form an amorphous layer containing Si and O on the treated aluminum nitride-containing powder.

8. The method of claim 1, wherein the coating step is performed by
    (a) dispersing the aluminum nitride-containing powder in an alkyl alcohol having from 1 to 4 carbon atoms, inclusive, to form a dispersion, and
    (b) dissolving into the dispersion, in the following order:
        (i) the silicate and (ii) water.

9. The method of claim 8, wherein a hydrolysis catalyst is dissolved into the dispersion after the water.

10. The method of claim 1, wherein the coating step is performed by coating the aluminum nitride-containing powder with a coating solution which includes an alkyl alcohol having from to 4 carbon atoms, inclusive, the silicate, and water.

11. The method of claim 10, wherein the coating solution further includes a hydrolysis catalyst selected from the group consisting of acids and bases.

12. The method of claim 10, wherein the coating solution is allowed to contact the aluminum nitride-containing powder for at least about 5 minutes before performing the heat-treating step.

13. The method of claim 11, wherein the hydrolysis catalyst is selected from the group consisting of organic acids selected from the group consisting of acetic acid, formic acid, and propionic acid, inorganic acids selected from the group consisting of hydrochloric acid and sulfuric acid.

14. The method of claim 11, wherein the hydrolysis catalyst is selected from the group consisting of bases selected from the group consisting of sodium hydroxide, potassium hydroxide, and ammonium hydroxide.

15. The method of claim 11, wherein, in the coating solution,
the alkyl alcohol is employed in an amount from about 50 to about 300 volume percent based on the volume of the aluminum nitride-containing powder,
the silicate is employed in an amount from greater than about 1 to about 150 weight percent based on the weight of the aluminum nitride-containing powder,
the water is employed in an amount from about 100 to about 400 weight percent based on the weight of the silicate, and
the hydrolysis catalyst is employed in an amount from about 10 to about 75 weight percent based on the weight of the water.

16. The method of claim 15, wherein the silicate is employed in an amount from about 5 to about 50 weight percent based on the weight of the aluminum nitride-containing powder and the water is employed in an amount from about 100 to about 200 weight percent based on the weight of the silicate.

17. A method for making a moisture-resistant aluminum nitride powder, comprising:
(a) coating a layer of a silicate onto aluminum nitride powder by
(i) dispersing the aluminum nitride powder in a first alkyl alcohol having from 1 to 4 carbon atoms, inclusive, to form a dispersion, and
(ii) dissolving into the dispersion, in the following order:
(A) a solution of the silicate and a second alkyl alcohol having from 1 to 4 carbon atoms, inclusive, the silicate having substituents thereon selected from the group consisting of alkyl and alkoxyalkyl radicals, the silicate being employed in an amount from greater than about 1 to about 150 weight percent based on the weight of the aluminum nitride powder, the first and second alkyl alcohols being employed in an amount from about 50 to about 300 volume percent based on the volume of the aluminum nitride powder,
(B) water being employed in an amount from about 100 to about 400 weight percent based on the weight of the silicate, and
(C) a hydrolysis catalyst selected from the group consisting of organic acids selected from the group consisting of acetic acid, formic acid, and propionic acid, inorganic acids selected from the group consisting of hydrochloric acid and sulfuric acid, and bases selected from the group consisting of sodium hydroxide, potassium hydroxide, and ammonium hydroxide, the hydrolysis catalyst being employed in an amount from about 10 to about 75 weight percent based on the weight of the water,
the aluminum nitride powder, the alkyl alcohols, the silicate, the water, and the hydrolysis catalyst forming a dispersion-solution,
(b) allowing the aluminum nitride powder to contact the remaining components in the dispersion-solution for at least 5 minutes,
(c) drying the dispersion-solution to form coated aluminum nitride powder, and
(d) heat-treating the coated aluminum nitride powder at a temperature of from about 350° to about 1000° C. for a period of time sufficient to cause the silicate to react with the aluminum nitride powder thereby forming a layer of Si—Al—O—N bonded to the aluminum nitride powder.

* * * * *

UNITED STATES PATENT AND TRADEMARK OFFICE
CERTIFICATE OF CORRECTION

PATENT NO. : 5,234,712
DATED : August 10, 1993
INVENTOR(S) : Kevin E. Howard

It is certified that error appears in the above-identified patent and that said Letters Patent is hereby corrected as shown below:

Col. 8, line 37 should correctly read --- method of claim 1, wherein ---.

Col. 8, line 39 should correctly read --- method of claim 1, wherein ---.

Col. 9, line 7 should correctly read --- alcohol having from 1 to 4 carbon ---.

Signed and Sealed this

Tenth Day of May, 1994

Attest:

BRUCE LEHMAN

*Attesting Officer*    *Commissioner of Patents and Trademarks*